United States Patent
Wittenberg et al.

(10) Patent No.: US 8,279,106 B1
(45) Date of Patent: Oct. 2, 2012

(54) GROUND SURVEILLANCE SEGMENT DETECTION RADAR PERFORMANCE ANALYSIS

(75) Inventors: Peter S. Wittenberg, Creve Coeur, MO (US); Vicki Huo, Potomac, MD (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/955,897

(22) Filed: Nov. 29, 2010

(51) Int. Cl.
*G01S 13/00* (2006.01)
(52) U.S. Cl. ...................................... 342/25 R; 342/95
(58) Field of Classification Search ................ 342/25 R, 342/95
See application file for complete search history.

(56) References Cited

U.S. PATENT DOCUMENTS

2010/0019954 A1* 1/2010 Mizutani et al. ............. 342/147

* cited by examiner

*Primary Examiner* — Timothy A Brainard
(74) *Attorney, Agent, or Firm* — Ameh IP; Lowell Campbell; Elahe Toosi

(57) ABSTRACT

A method for ground surveillance radar performance analysis is disclosed. A vector of point data items indexed by time offset, and comprising a point probability of detection is received. A plurality of initial azimuths of a simulated radar signal of the radar tower is determined based on the radar field-of-regard. A plurality of initial azimuth segment probabilities of detection are calculated for each of the initial azimuths respectively based on the vector of point data items and the initial azimuths, and a segment probability of detection is determined based on the initial azimuth segment probabilities of detection.

20 Claims, 10 Drawing Sheets

GROUND SURVEILLANCE SEGMENT DETECTION RADAR PERFORMANCE ANALYSIS

FIELD

Embodiments of the present disclosure relate generally to radar. More particularly, embodiments of the present disclosure relate to radar performance analysis.

BACKGROUND

Terrorism, drug smuggling, illegal border crossing, and other issues necessitate an increasing need for ground surveillance and border security. In order to cover large areas efficiently, ground surveillance and border security may utilize radar for detection of items of interest such as walking people and moving vehicles. However, national borders and other areas where ground surveillance may be utilized are often locations with difficult terrain such as mountains, river valleys, gullies, and arroyos. Furthermore, foliage and other obscurants may block or attenuate radar signals used for surveillance.

SUMMARY

A method for ground surveillance radar performance analysis is disclosed. A vector of point data items indexed by time offset, and comprising a point probability of detection is received. A plurality of initial azimuths of a simulated radar signal of a radar tower is determined based on a radar field-of-regard. A plurality of initial azimuth segment probabilities of detection are calculated for each of the initial azimuths respectively based on the vector of point data items and the initial azimuths, and a segment probability of detection is determined based on the initial azimuth segment probabilities of detection.

In a first embodiment, a method for ground surveillance radar performance analysis receives a vector of point data items indexed by time offset, the point data items comprising a point probability of detection. A plurality of initial azimuths of a simulated radar signal of a radar tower is determined based on the field-of-regard of the radar tower. A plurality of initial azimuth segment probabilities of detection of a COP lead are calculated for each of the initial azimuths respectively based on the vector of point data and the initial azimuths, and a segment probability of detection is determined based on the initial azimuth segment probabilities of detection of the COP lead.

In a second embodiment, a ground surveillance radar performance analysis system comprises a storage module, a scan module, a radar track initiation module, a fusion module, a COP lead initial azimuth simulation module, a COP lead instance simulation module, and a segment COP lead simulation module. The storage module is operable to store a vector of point data items indexed by time offset, the point data items comprising a point probability of detection. The scan module is operable to determine a plurality of initial azimuths of a simulated radar signal of a radar tower based on a field-of-regard of the radar tower. The radar track initiation module is operable to calculate a plurality of initial azimuth segment probabilities of detection for each of the initial azimuths respectively based on the vector of point data items and the initial azimuths. The fusion module is operable to calculate a probability of meeting data fusion requirements for a radar track. The COP lead instance simulation module is operable to calculate a probability of detection of a COP lead for a point based on the point probability of detection. The COP lead initial azimuth simulation module is operable to calculate a probability of detection of a COP lead for the segment for one of the initial azimuths based on a probability of detection of the COP lead for each point of the segment and the probability of meeting data fusion requirements for the radar track to obtain the initial azimuth segment probabilities of detection of the COP lead. And the segment COP lead simulation module is operable to determine a segment probability of detection based on the initial azimuth segment probabilities of detection of the COP lead.

In a third embodiment, a method for visualizing a ground surveillance radar performance analysis receives a vector of point data items indexed by time offset, the point data items comprising a point probability of detection and a point location. A point COP lead probability of detection is calculated based on the point probability of detection and the point location for each point of the point data items. A symbolic representation is plotted based on the point COP lead probability of detection on a terrain surface representation for all time offsets and initial azimuth based on the location for a subset of the point data items. A segment COP lead probability of detection is calculated based on the point probability of detection and the point location for the vector of the point data items. The segment COP lead probability of detection is then plotted.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to radar statistical analysis, radar technology, mathematical modeling, measurement techniques, and other functional aspects of the systems (and the individual operating components of the systems) may not be described in detail herein. In addition, those skilled in the art will appreciate that embodiments of the present disclosure may be practiced in conjunction with a variety of computational hardware and software, and that the embodiments described herein are merely example embodiments of the disclosure.

Embodiments of the disclosure are described herein in the context of a practical non-limiting application, namely, border surveillance. Embodiments of the disclosure, however, are not limited to such border surveillance applications, and the techniques described herein may also be utilized in other applications. For example but without limitation, embodiments may be applicable to surveillance around airports, buildings, fields, military force protection systems, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Embodiments of the disclosure provide a ground surveillance radar performance analysis system that provides a closed form probability analysis that has superior accuracy vs. Monte Carlo based techniques and about 300× faster speed (no supercomputer required). Visualization provided herein (not generally possible in a Monte Carlo technique) allows a user to identify detection problem areas.

Figure 1:
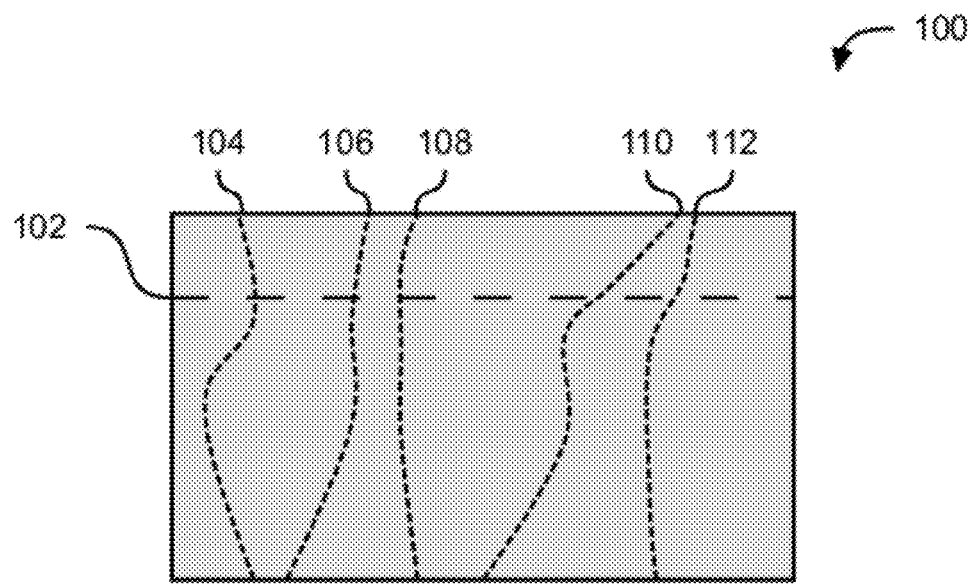
FIG. 1 is an illustration of a border area where items of interest cross a border along paths.

FIG. 1 is an illustration of a border area 100 where items of interest (not shown) cross a border 102 along paths 104, 106, 108, 110, and 112. The border area 100 may comprise, for example but without limitation, plains, deserts, mountains, rivers, lakes, valleys, paved roads, unpaved roads, and the like. The items of interest may comprise, for example but without limitation, walking people, and various vehicles such as motorcycles, cars, trucks, vans, aircraft, and the like. A speed of items of interest along the paths 104-112 may comprise, for example but without limitation, 3 km/hour, 40 km/hour, and the like.

Figure 2:
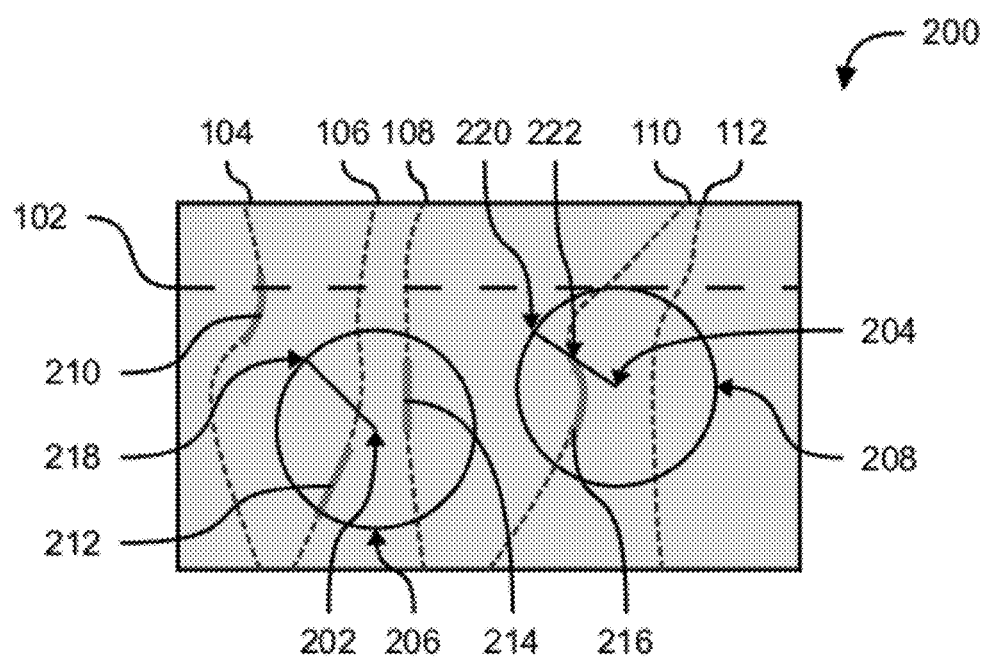
FIG. 2 is an illustration of a ground surveillance radar for detecting items of interest in the border area of FIG. 1 crossing the border along the paths according to an embodiment of the disclosure.

FIG. 2 is an illustration of a ground surveillance radar system 200 for detecting the items of interest in the border area 100 of FIG. 1 crossing the border 102 along the paths 104-112 according to an embodiment of the disclosure. The ground surveillance radar system 200 comprises radar towers 202 and 204 that cover scan areas 206 and 208 respectively. In order to test performance of the ground surveillance radar system 200, test data can be collected along known path segments 210-216 of the paths 104-112. The radar towers 202 and 204 comprise radar beams 218 and 220 respectively that scan the scan areas 206 and 208 respectively. As the radar beams 218 and 220 scan the scan areas 206 and 208, the radar beams 218 and 220 intercept the path segments 212-216 at interception points (e.g., interception point 222). When the test data is collected along known path segments 210-216, data may be collected comprising, for example but without limitation, latitude, longitude, signal-to-interference ratio (SIR) of a signal from the radar towers 202/204, a probability of detection, a radial velocity relative to the radar towers 202/204, an obscuration of a simulated item of interest (fractional target), and the like. The test data may be collected at regular time intervals, for example but without limitation, at half second intervals, at one second intervals, at five second intervals, and the like.

Figure 3:
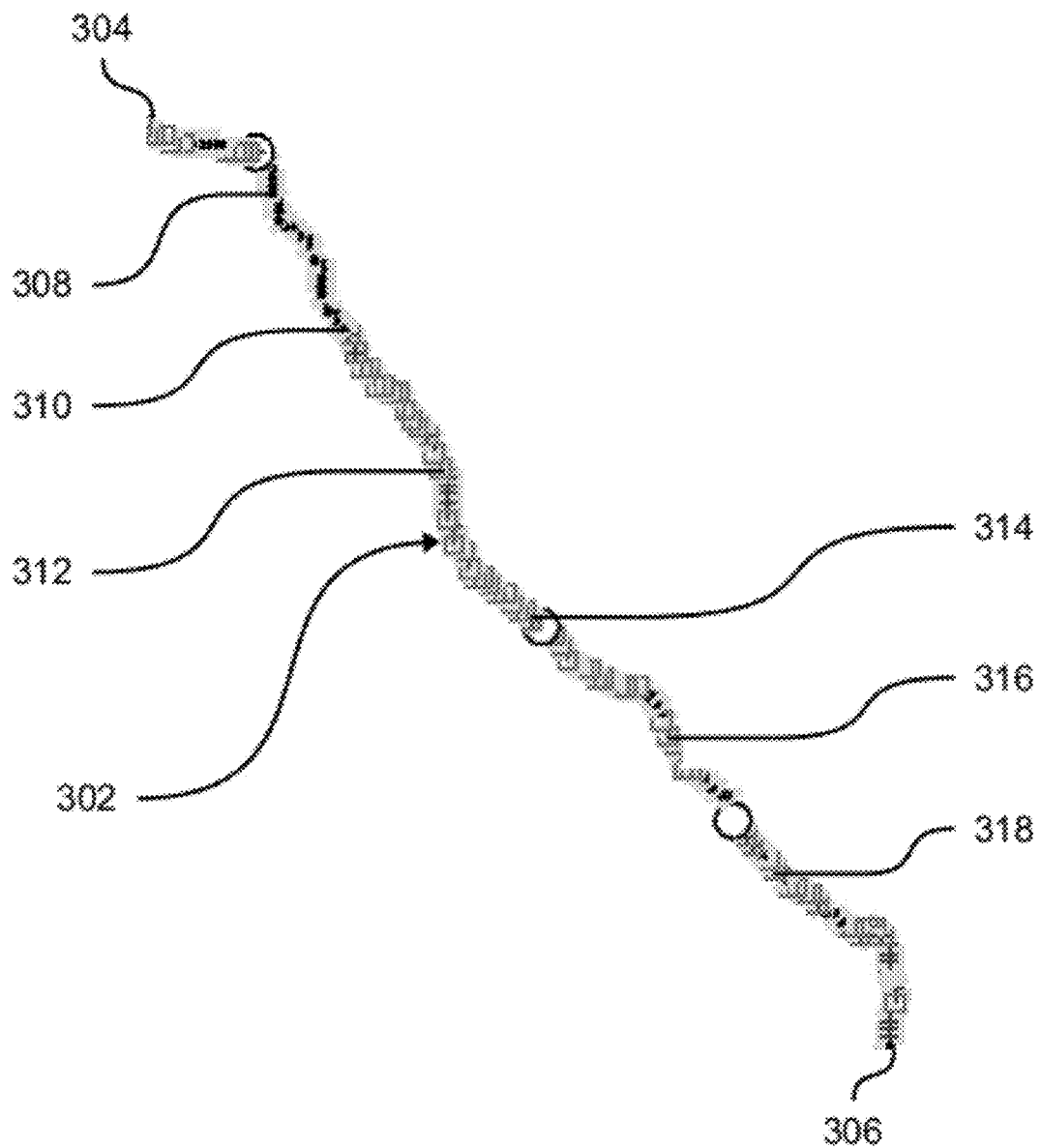
FIG. 3 is an illustration of a test segment with radar interception points according to an embodiment of the disclosure.

FIG. 3 is an illustration of a test segment 300 with radar interception points 308-318 (222 in FIG. 2) according to an embodiment of the disclosure. The test segment 300 comprises a series of points 302 starting from a starting point 304 and ending at an ending point 306. As a radar beam (218/220 in FIG. 2) scans around a radar tower (202/204 in FIG. 2), the radar beam intercepts the test segment 300 at the radar interception points 308-318 along the test segment 300.

Figure 4:
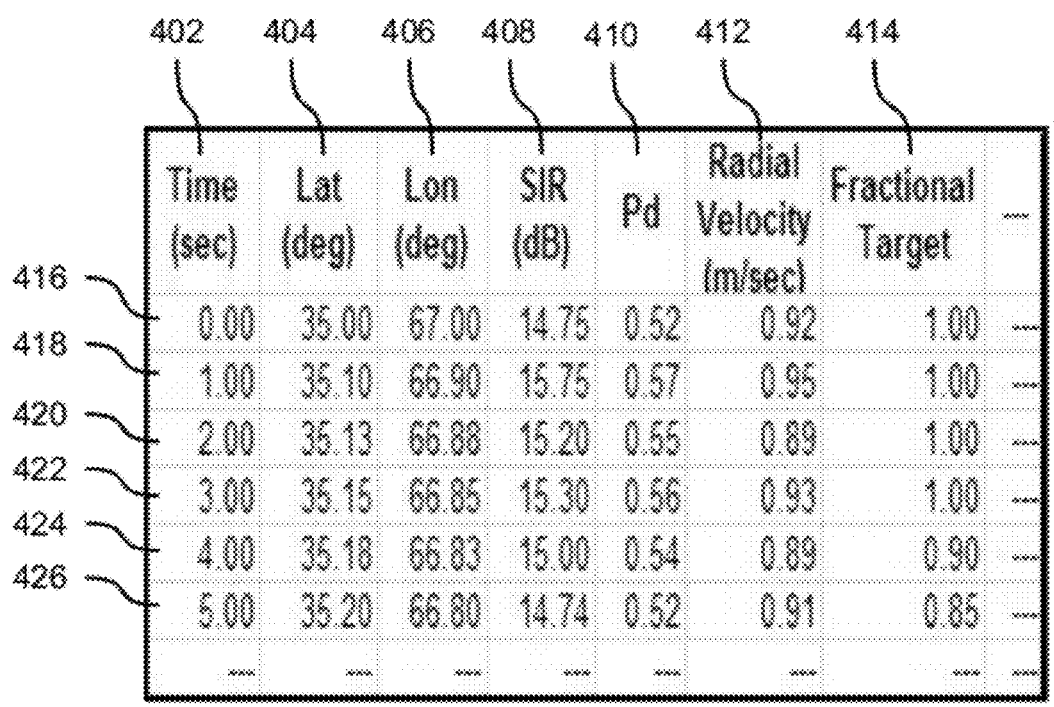
FIG. 4 is an illustration of segment point data indexed by time offset according to an embodiment of the disclosure.

FIG. 4 is an illustration of segment point data 400 indexed by time offset 402 according to an embodiment of the disclosure. The segment point data 400 for each point (e.g., each point in the series of points 302 in FIG. 3) may comprise the time offset 402, a location such as a latitude 404, a longitude 406, a signal-to-interference ratio (SIR) 408, a (single look) probability of detection 410, a radial velocity 412, and an obscuration (fractional target) 414. The segment point data 400 (table 400) comprises data measured at a plurality of points 416-426. The location may comprise, for example but without limitation, a latitude 404, a longitude 406, an elevation, a set of GPS coordinates, and the like.

Figure 5:
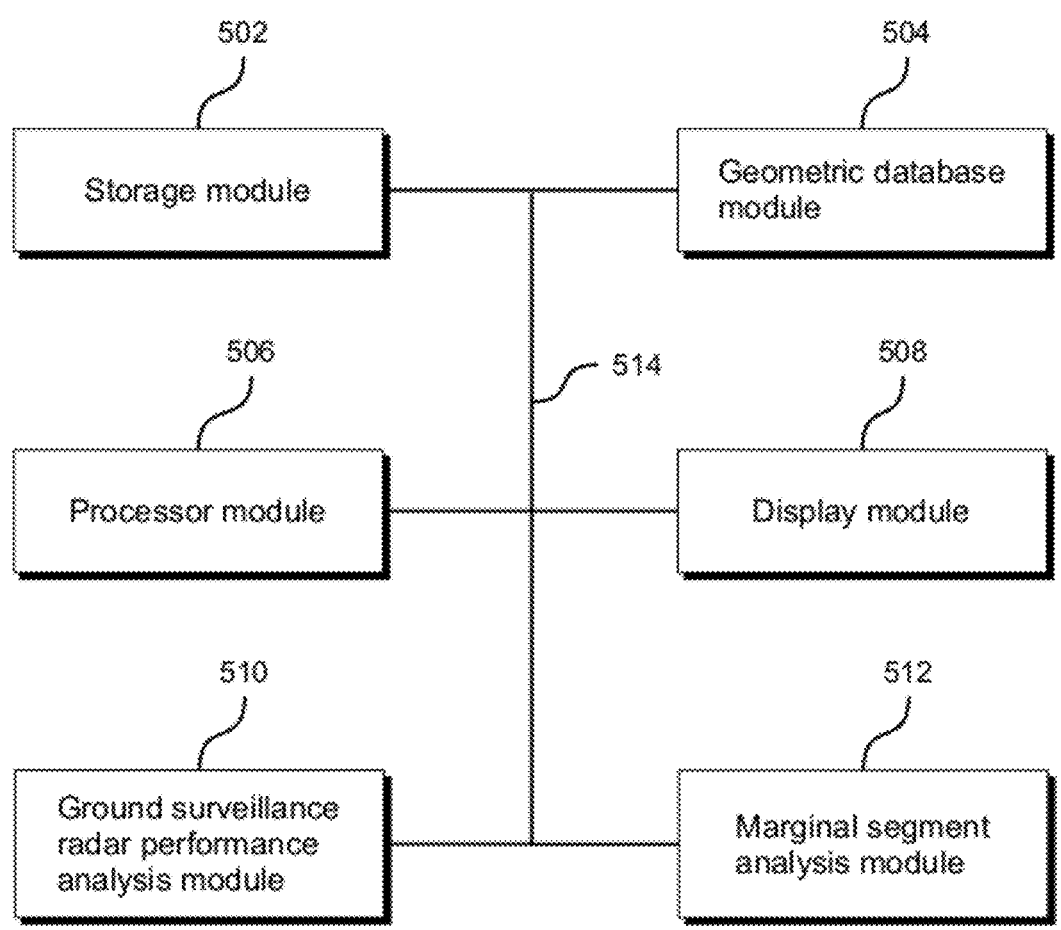
FIG. 5 is an illustration of a functional block diagram of a ground surveillance radar performance analysis system according to an embodiment of the disclosure.

FIG. 5 is an illustration of a functional block diagram of a ground surveillance radar performance analysis system 500 according to an embodiment of the disclosure. The ground surveillance radar performance analysis system 500 (system 500) comprises a storage module 502, a geometric database module 504, a processor module 506, a display module 508, a ground surveillance radar performance analysis module 510, and a marginal segment analysis module 512 that may be coupled by a communication bus 514.

The storage module 502 may be any suitable data storage area with suitable amount of memory that is formatted to support the operation of the system 500. The storage module 502 is configured to store, maintain, and provide data as needed to support the functionality of the system 500 in the manner described below. The storage module 502 is operable to store input and output parameters of the system 500. The storage module 502, stores for example but without limitation, the time offset 402, the latitude 404, the longitude 406, the signal-to-interference ratio 408, the probability of detection 410, the radial velocity 412, and the obscuration (fractional target) 414, and the like. In practical embodiments, the storage module 502 may comprise, for example but without limitation, a non-volatile storage device (non-volatile semiconductor memory, hard disk device, optical disk device, and the like), a random access storage device (for example, SRAM, DRAM), or any other form of storage medium known in the art.

The storage module 502 may also store, a computer program that is executed by the processor module 506, an operating system, an application program, tentative data used in executing a program processing, and the like. The storage module 502 may be coupled to the processor module 506 such that the processor module 506 can read information from and write information to storage module 502. As an example, the processor module 506 and storage module 502 may reside in their respective ASICs. The storage module 502 may also be integrated into the processor module 506. In an embodiment, the storage module 502 may comprise a cache memory for storing temporary variables or other intermediate information during execution of instructions to be executed by the processor module 506.

The geometric database module 504 is operable to receive a vector (i.e., a 1 dimensional array) of point data items indexed by time offset for the test segment 300. The vector of point data items may be received from, for example but without limitation, recorded direct empirical observations, measure point data from walkers carrying Global Positioning System (GPS) measurement devices who have traversed the path segments 210-216 and/or the paths 104-112, a radar simulation (simulated radar) of the path segments 210-216 and/or the paths 104-112, and the like. The point data items (points) may comprise, for example but without limitation, the location such as the latitude 404, the longitude 406, the signal-to-interference ratio 408, the probability of detection 410, the radial velocity 412, the obscuration (fractional target) 414, and the like. The vector of point data items or a subset thereof may be referred to herein as a segment.

The processor module 506 is configured to support functions of the system 500. For example, the processor module 506 may control operations of the system 500 so that processes of the system 500 are suitably performed. These processes may comprise, for example but without limitation, controlling operation of the ground surveillance radar performance analysis module 510 to obtain and plot segment probabilities of detection on the display module 508. In this manner, processor module 506 causes system 500 to obtain an accurate probability of detection of an item of interest in presence of foliage and other obscurants using the vector of point data items (segment) such as data shown in the table 400. Furthermore, the processor module 506 may automatically output data to an input of an operating device (i.e. communication device) causing the operating device to alert an operator of a possible detection of the item of interest.

The processor module 506 also controls the display module 508 to display data such as a plot of segment probability of detection $P_{segment\ COP\ lead}$, a probability of detection of a COP lead at a point $P_{COP\ lead\ ik}$, and the like, on the display module 508. Further, the processor module 506 accesses the storage module 502 to access, for example but without limitation, the vector of point data indexed by time offset 402, the point probability of detection 410, the latitude 404, the longitude 406, and the like. The processor module 506, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, the processor module 506 comprises processing logic that is configured to carry out the functions, techniques, and processing tasks associated with the operation of system 500. In particular, the processing logic is configured to support e.g., power utilization scheduling described herein.

The display module 508 is configured to display input and output parameters of the system 500. For example, the display module 508 is operable to display a plot on a display screen (not shown). The plot may comprise, for example but without limitation, a segment probability of detection $P_{segment\ COP\ lead}$ (e.g., 1110 in FIG. 11), a symbolic representation based on a probability of detection of a COP lead at a point $P_{COP\ lead\ ik}$, (e.g., 1114-1118 in FIG. 11), and the like. The plot provides a visualization 1100 (FIG. 11) on a plotted segment for a user as explained in more detail below. The display module 508 may accept a user input operation to input and transmit data, and input operation commands for functions provided in the system 500. The display module 508 accepts the operation command, and outputs operation command information to the processor module 506 in response to the accepted operation command. The display module 508 may be formed by, for example but without limitation, an organic electro-luminescence (OEL) panel, liquid crystal panel (LCD), and the like. Various kinds of information can be displayed on the display module 508 via an image/video signal supplied from the processor module 506.

The ground surveillance radar performance analysis module 510 is operable to perform a simulation for analyzing performance of a ground surveillance radar. The ground surveillance radar performance analysis module 510 simulates a radar response to a travel path of an item of interest and determines a probability of detection of a common operating picture (COP) lead for a segment from the geometric database module 504. A common operating picture (COP) may comprise, for example but without limitation, a display of operational information such as locations of items of interest and deployed resources shared by at least one command center, and the like. The COP may facilitate collaboration and planning, and enhance situational awareness. A COP lead may comprise, for example but without limitation, a detection or indication of detection of an item of interest, and the like that may be used by the COP to indicate a lead for finding or tracking on an item of interest. The ground surveillance radar performance analysis module 510 is described in more detail below in the context of discussion of FIG. 6.

The marginal segment analysis module 512 determines the test segment 300 is a marginal segment, if the segment probability of detection meets a marginal segment criterion. The marginal segment criterion may comprise, for example but without limitation, the segment probability of detection falling below a probability threshold, a low SIR, and the like, as explained in more detail below in the context of discussion of FIG. 11.

Figure 6:
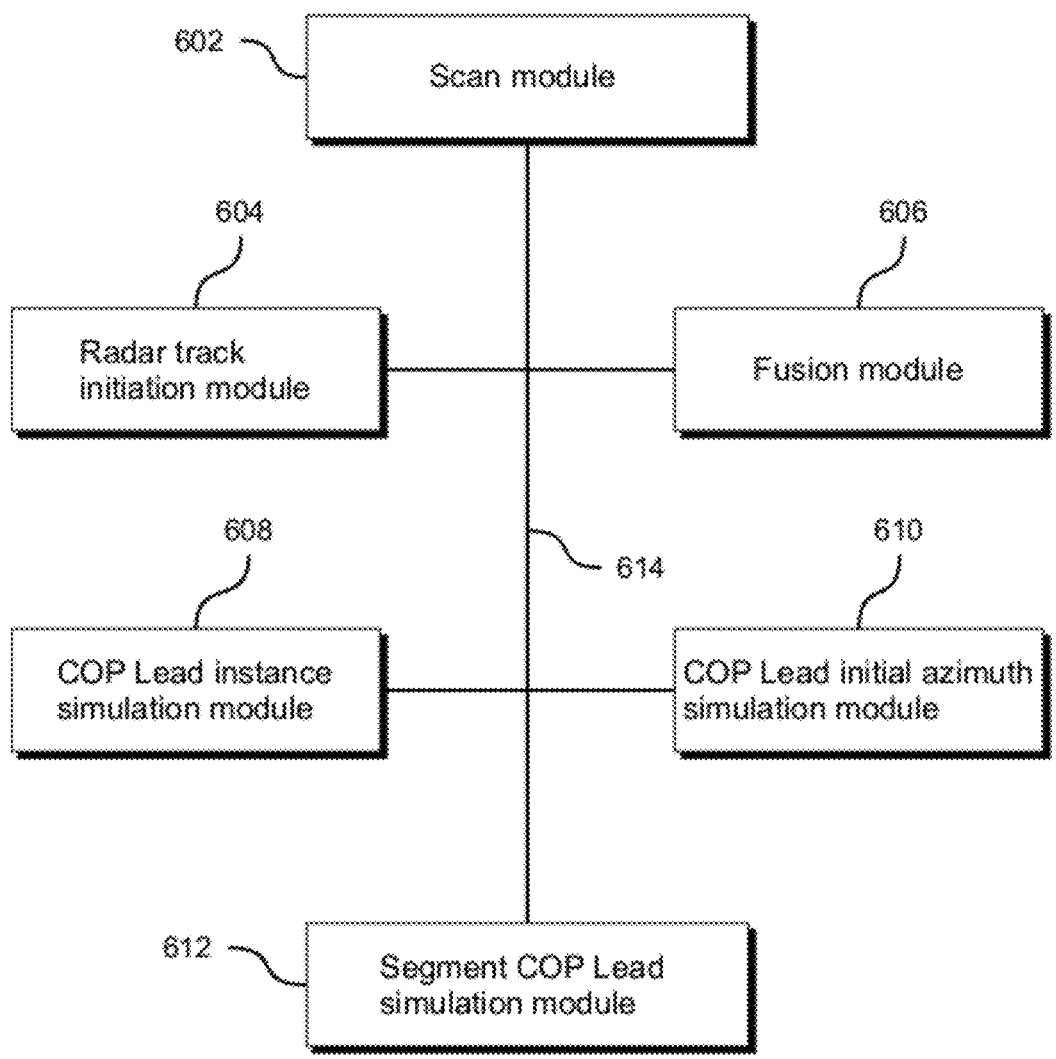
FIG. 6 is an illustration of a functional block diagram of a ground surveillance radar performance analysis system according to an embodiment of the disclosure.

FIG. 6 is an illustration of a functional block diagram of a ground surveillance radar performance analysis system 600 (module 510 in FIG. 5) according to an embodiment of the disclosure. The ground surveillance radar performance analysis system 600 (system 600) may comprise a scan module 602, a radar track initiation module 604, a data fusion module 606, a COP lead instance simulation module 608, a COP lead initial azimuth simulation module 610, and a segment COP lead simulation module 612 that may be coupled by a bus 614. The system 600 is calibrated to a terrain by measuring at least one radar detection on at least one point on the terrain.

The scan module 602 is operable to: receive a segment from the geometric database module 504; calculate a geometric relationship of the latitude and the longitude to a location of a radar tower 202/204 for each of the points of the segment; and determine a plurality of initial azimuths of a simulated radar signal of the radar tower 202/204 based on a field-of-regard of the radar tower 202/204. A field-of-regard may comprise, for example but without limitation, an angular area within which the sensor can detect items of interest for a specified search rate, and the like. The field-of-regard may extend from a minimum azimuth to a maximum azimuth. If the radar tower 202/204 is a double scan radar, the scan module 602 may be operable to determine points scanned and collate data for a double scan of the radar tower 202/204.

The scan module 602 may be further operable to partition the vector of point data into a plurality of partitions $p_k(i)$ comprising a probability of detection for each point (e.g., the radar interception points 308-318) of the vector of point data that is scanned starting from an initial azimuth k.

The radar track initiation module 604 is operable to determine a probability of detecting if a radar track exists in the segment by simulating a radar scan starting from one of the initial azimuths. Determination of the radar track is generally a property of a type of radar used by a radar system to be simulated. For example but without limitation, the radar system may require 3 hits, 3 correlating hits, 3 consecutive hits, 3 hits out of 5 scans, 5 hits out of 12 scans, and the like to determine the radar track exists. A hit may comprise, for example but without limitation, a point having an SIR greater than a detection threshold, and the like. The detection threshold may comprise, for example but without limitation, about 10-15 dB, and the like. The radar track initiation module 604 is operable to calculate a plurality of initial azimuth segment probabilities of detection for each of the initial azimuths respectively based on the vector of point data using the following relationship:

$$\text{Radar } Pd(i) = \prod_{j=1}^{T} p_k(i-j),$$

where Radar Pd(i) is a probability of detection of a radar track at a point (a point probability of detection), T is a number of intercept points required to determine the radar track, and $p_k(i-j)$ is a probability of detection (410 in FIG. 4) of a point with time offset i-j. This is T intercepts in a row to form the radar track, which is a way that an Advanced Radar Surveillance System (ARSS) radar detects a track. However, radars can use other techniques to initiate tracks, for example but without limitation, S hits out of T intercept points is a more general detection criterion where S and T are selected for a radar design, and the like.

The data fusion module 606 is operable to calculate a probability of meeting data fusion requirements for a radar track. The data fusion requirements are generally required in a radar system to insure that data received for a track comprise a track for a single object. Thus, if a track meets the data fusion requirements, then track data may be "fused" as it may be from a single object. The data fusion requirements may comprise, for example but without limitation, receiving two additional hits in two minutes. There is no need for the hits to be consecutive for the COP lead, but there is a time limit, typically about 2 minutes, thus any correlating radar hit criterion may be used. A radar hit may comprise a point of the vector of point data at point offset i comprising a signal to interference ratio (SIR) greater than a detection threshold.

The probability of getting greater than H radar hits may be determined by the following relationship:

$$P_{hit\ i}(\geq H) = 1 - \sum_{k=0}^{H-1} P_{hit\ i}(j),$$

where $P_{hit\ i}(j)$ is a probability of detection of j radar hits, and H is a number of radar hits, $P_{hit\ i}(j)$ is the probability of detection of j radar hits occurring within a specified time.

$P_{hit\ i}(j)$ where j=0 can be computed by the following relationship:

$$P_{hit\ i}(j=0) = \prod_{u=1}^{M} (1 - p_k(i+u)),$$

where M is equal to a number of radar scans within a specified time (e.g., 5).

$P_{hit\ i}(j)$ where j=1, can be computed by the following relationship:

$$P_{hit\ i}(j=1) = \sum_{v=1}^{M} \left[ p_k(i+v) * \prod_{\substack{u=1 \\ j \neq v}}^{M} (1 - p_k(i+u)) \right],$$

where M is equal to a number of radar scans within a specified time (e.g., 5). i, u and v may comprise, for example but without limitation, an index, a time offset, and the like.

The COP lead instance simulation module 608 is operable to calculate a probability of detection of the COP lead for a point based on the probability of detection if a radar track exists and the probability of meeting data fusion requirements for the radar track. The COP lead instance module 608 is operable to determine the COP lead probability of detection $P_{COP\ lead\ ik}$ based on the initial azimuth segment probabilities of detection using the following relationships:

$$P_{COP\ lead\ ik} = \text{Radar } Pd(i) * P_{hit\ i}(\geq H)$$

where $P_{COP\ lead\ ik}$ is a probability of detection of a COP lead at a point (a point COP lead probability of detection) with time offset i and initial azimuth k, Radar Pd(i) is a probability of detection of the radar track for the point (a point probability of detection) with the time offset i, and $P_{hit\ i}(\geq H)$ is a probability of getting greater than H radar hits within a specified time.

The COP lead initial azimuth simulation module 610 is operable to calculate a probability of detection of the COP lead for the segment for one of the initial azimuths based on the probability of detection of the COP lead for each point (or a subset of points) of the segment and the probability of meeting data fusion requirements for the radar track to obtain an initial azimuth segment probability of detection of the COP lead. In this manner, the COP lead initial azimuth simulation module 610 determines an initial time offset for an initial azimuth, determines points scanned, collates data, and computes a segment probability of detection for the initial azimuth to obtain an initial azimuth segment probability of detection $P_{azimuth\ segment\ COP\ lead\ k}$ based on the following relationship:

$$P_{azimuth\ segment\ COP\ lead\ k} = 1 - \prod_{i=1}^{N} (1 - P_{COP\ lead\ ik}),$$

where $P_{azimuth\ segment\ COP\ lead\ k}$ is the initial azimuth segment probability of detection of a segment COP lead for an initial azimuth k, N is a number of points intercepted for the initial azimuth k, and $P_{COP\ lead\ ik}$ is a probability of detection of a COP lead for a point (point COP lead probability of detection) with time offset i and initial azimuth k.

The segment COP lead simulation module 612 is operable to calculate a probability of detection of a COP lead for a segment (segment COP lead probability of detection) for all of the initial azimuths based on the probability of detection of a COP lead for a segment for each of the initial azimuths. The segment COP lead probability of detection can be calculated using the following relationship for all $P_{COP\ lead\ ik}$ in each initial azimuth segment for all initial azimuths:

$$P_{segment\ COP\ lead} = \frac{1}{Q}\sum_{k=1}^{Q} P_{azimuth\ segment\ COP\ lead\ k},$$

where $P_{segment\ COP\ lead}$ is the segment probability of detection (segment COP lead probability of detection), $P_{azimuth\ segment\ COP\ lead\ k}$ is the initial azimuth segment probability of detection of the COP lead for an initial azimuth k, Q is a number of initial azimuths.

Figure 7:
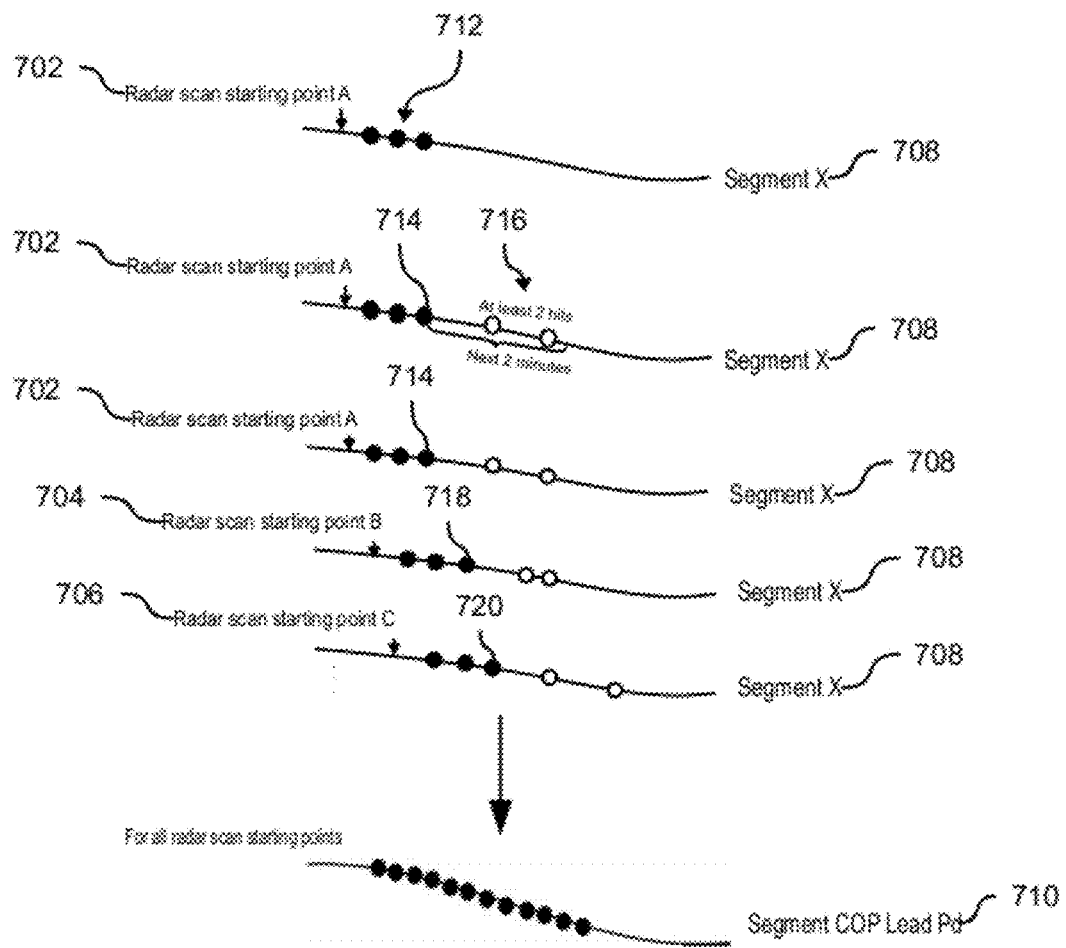
FIG. 7 is an illustration of an exemplary segment COP lead probability of detection process according to an embodiment of the disclosure.

FIG. 7 is an illustration of an exemplary segment COP lead probability of detection process 700 according to an embodiment of the disclosure. When a scan starts at one of the initial azimuths (radar starting point A), the scan will intersect a segment X 708 at a point 702. Thus, a radar track with a probability of detection of a radar track Radar $P_d(i)$ is initiated to detect if a track exists (e.g., 3 hits in 3 radar scans 712). If the track exists for a point 714, then the data fusion requirements $P_{hit\ i}(\geq H)$, are checked (e.g., at least 2 additional hits in a next 2 minutes 716). Then, the probability of detection of the COP lead at the point $P_{COP\ lead\ ik}$ is calculated for each point 714 (i.e., there may be several points at anyplace in a segment) of the segment X 708 for the one of the initial azimuths (i.e., based on 3 out of 3, followed by at least 2 additional hits in next 2 minutes). A plurality of the initial azimuth segment probability of detection of COP lead $P_{azimuth\ segment\ COP\ lead\ k}$ is calculated for each of the initial azimuths. Each of the initial azimuths may intersect the segment at different places in the segment X 708 (e.g., 702, 704, and 706). Thus, interception points (e.g., 714, 718, and 720) may occur at different places in the segment X 708 for each of the initial azimuths. The segment COP lead probability of detection $P_{segment\ COP\ lead}$ 710 may be calculated from the initial azimuth segment probabilities of detection of the COP lead $P_{azimuth\ segment\ COP\ lead\ k}$. The $P_{segment\ COP\ lead}$ may be calculated as a mean of the initial azimuth segment probabilities of detection of the COP lead $P_{azimuth\ segment\ COP\ lead\ k}$. Interception points (e.g., 702, 704, 706, 714, 718, and 720) for all of the initial azimuths are shown on the segment probability of detection of the COP lead $P_{segment\ COP\ lead}$ 710. Some or all of the point COP lead probability of detection $P_{OOP\ lead\ ik}$ for time offset i and initial azimuth k can be visualized (1106 in FIG. 11) on the display screen of the display module 508 as explained in more detail in the context of discussion of FIG. 11 below.

Figure 8:
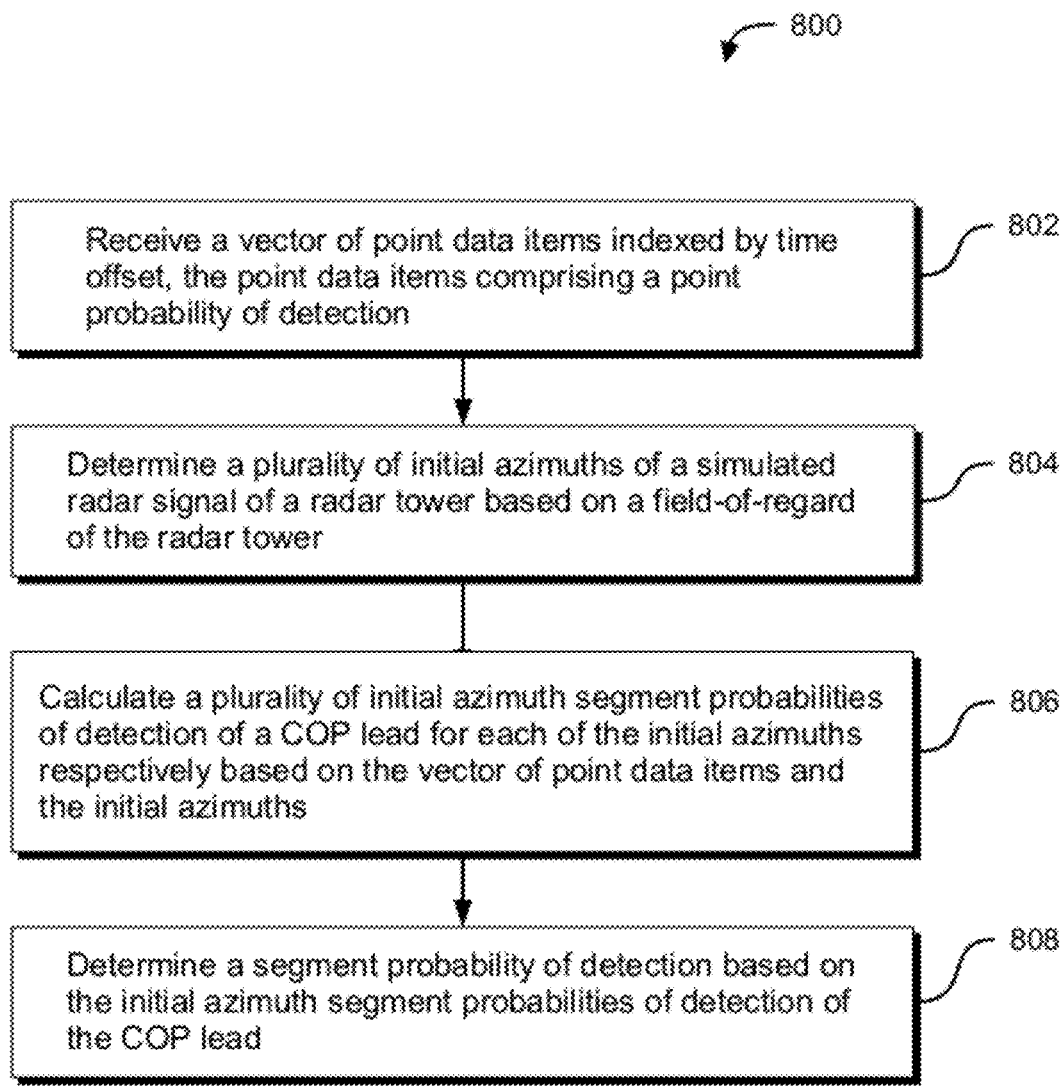
FIG. 8 is an illustration of an exemplary flowchart showing a ground surveillance radar performance analysis process according to an embodiment of the disclosure.

FIG. 8 is an illustration of an exemplary flowchart showing a ground surveillance radar performance analysis process 800 according to an embodiment of the disclosure. The various tasks performed in connection with process 800 may be performed mechanically, by software, hardware, firmware, or any combination thereof. It should be appreciated that process 800 may include any number of additional or alternative tasks, the tasks shown in FIG. 8 need not be performed in the illustrated order, and process 800 may be incorporated into a more comprehensive procedure or process having additional functionality not described in detail herein.

For illustrative purposes, the following description of process 800 may refer to elements mentioned above in connection with FIGS. 1-7. In practical embodiments, portions of the process 800 may be performed by different elements of the systems 500-600 such as: the storage module 502, the geometric data base module 504, the processor module 506, the display module 508, the marginal segment analysis module 512, the radar track initiation module 604, the data fusion module 606, the COP lead instance simulation module 608, the COP lead initial azimuth simulation module 610, and the segment COP lead simulation module 612. Process 800 may have functions, material, and structures that are similar to the embodiments shown in FIGS. 1-7. Therefore common features, functions, and elements may not be redundantly described here.

Process 800 may begin by the geometric database module 504 receiving a vector of point data items indexed by time offset, the point data items may comprise a point probability of detection (task 802). The point data items may also comprise a location (e.g., a latitude, a longitude and/or elevation).

Process 800 may continue by the scan module 602 determining a plurality of initial azimuths of a simulated radar signal of the radar tower 202/204 based on a field-of-regard of the radar tower 202/204 (task 804). If the radar tower 202/204 is a double scan radar, the scan module 602 may determine points scanned and collate data for a double scan of the radar tower 202/204.

Process 800 may continue by the COP lead initial azimuth simulation module 610 calculating a plurality of initial azimuth segment probabilities of detection of a COP lead $P_{azimuth\ segment\ COP\ lead\ k}$ for each of the initial azimuths respectively based on the vector of point data items and the initial azimuths (task 806).

Process 800 may continue by the segment COP lead simulation module 612 determining a segment probability of detection $P_{segment\ COP\ lead}$ based on the initial azimuth segment probabilities of detection of the COP lead $P_{azimuth\ segment\ COP\ lead\ k}$ (task 808).

Figure 9:
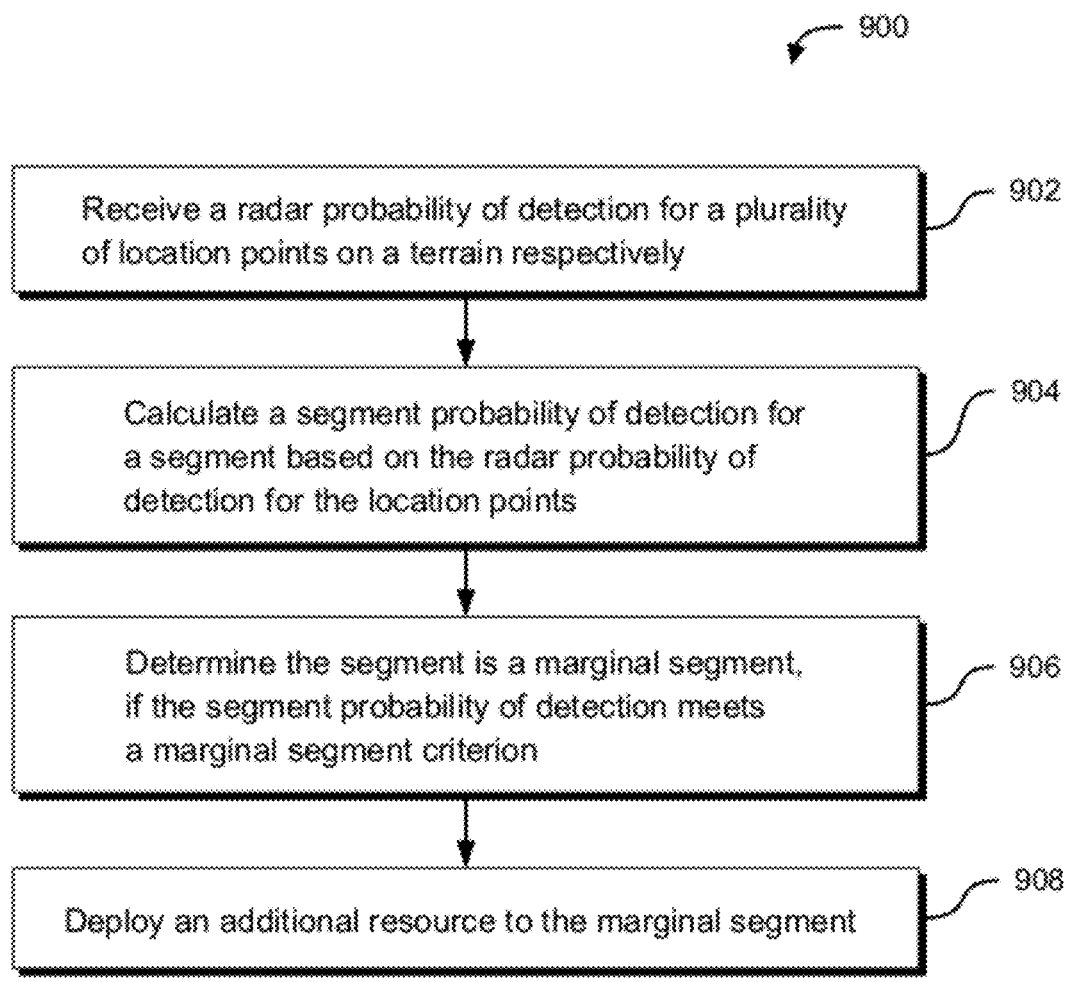
FIG. 9 is an illustration of an exemplary flowchart showing a process for using a ground surveillance radar performance analysis according to an embodiment of the disclosure.

FIG. 9 is an illustration of an exemplary flowchart showing a process 900 for using a ground surveillance radar performance analysis according to an embodiment of the disclosure. The various tasks performed in connection with process 900 may be performed mechanically, by software, hardware, firmware, or any combination thereof. It should be appreciated that process 900 may include any number of additional or alternative tasks, the tasks shown in FIG. 9 need not be performed in the illustrated order, and process 900 may be incorporated into a more comprehensive procedure or process having additional functionality not described in detail herein.

For illustrative purposes, the following description of process 900 may refer to elements mentioned above in connection with FIGS. 1-7. In practical embodiments, portions of the process 900 may be performed by different elements of the systems 500-600 such as: the storage module 502, the geometric database module 504, the processor module 506, the display module 508, the ground surveillance radar performance analysis module 510, marginal segment analysis module 512, the scan module 602, the radar track initiation module 604, the data fusion module 606, the COP lead instance simulation module 608, the COP lead initial azimuth simulation module 610, and the segment COP lead simulation module 612. The process 900 may have functions, material, and structures that are similar to the embodiments shown in FIGS. 1-7. Therefore common features, functions, and elements may not be redundantly described here.

Process 900 may begin by the geometric database module 504 receiving a radar probability of detection for a plurality of location points on a terrain respectively (task 902).

Process 900 may continue by the ground surveillance radar performance analysis system 600 (module 510 in FIG. 5) calculating a segment probability of detection for a segment based on the radar probability of detection for the location points (task 904).

Process 900 may continue by the marginal segment analysis module 512 determining the segment is a marginal segment, if the segment probability of detection meets a marginal segment criterion (task 906). The marginal segment criterion may comprise, for example but without limitation, a low SIR, and the like, as explained in more detail below in the context of discussion of FIG. 11.

Process 900 may continue by deploying an additional resource to the marginal segment (task 908). The additional resource may comprise, for example but without limitation, an image detector, a seismic detector, an audio detector, a motion detector, a vehicle, an aircraft, a human resource, a dog, and a barrier, and the like.

Figure 10:
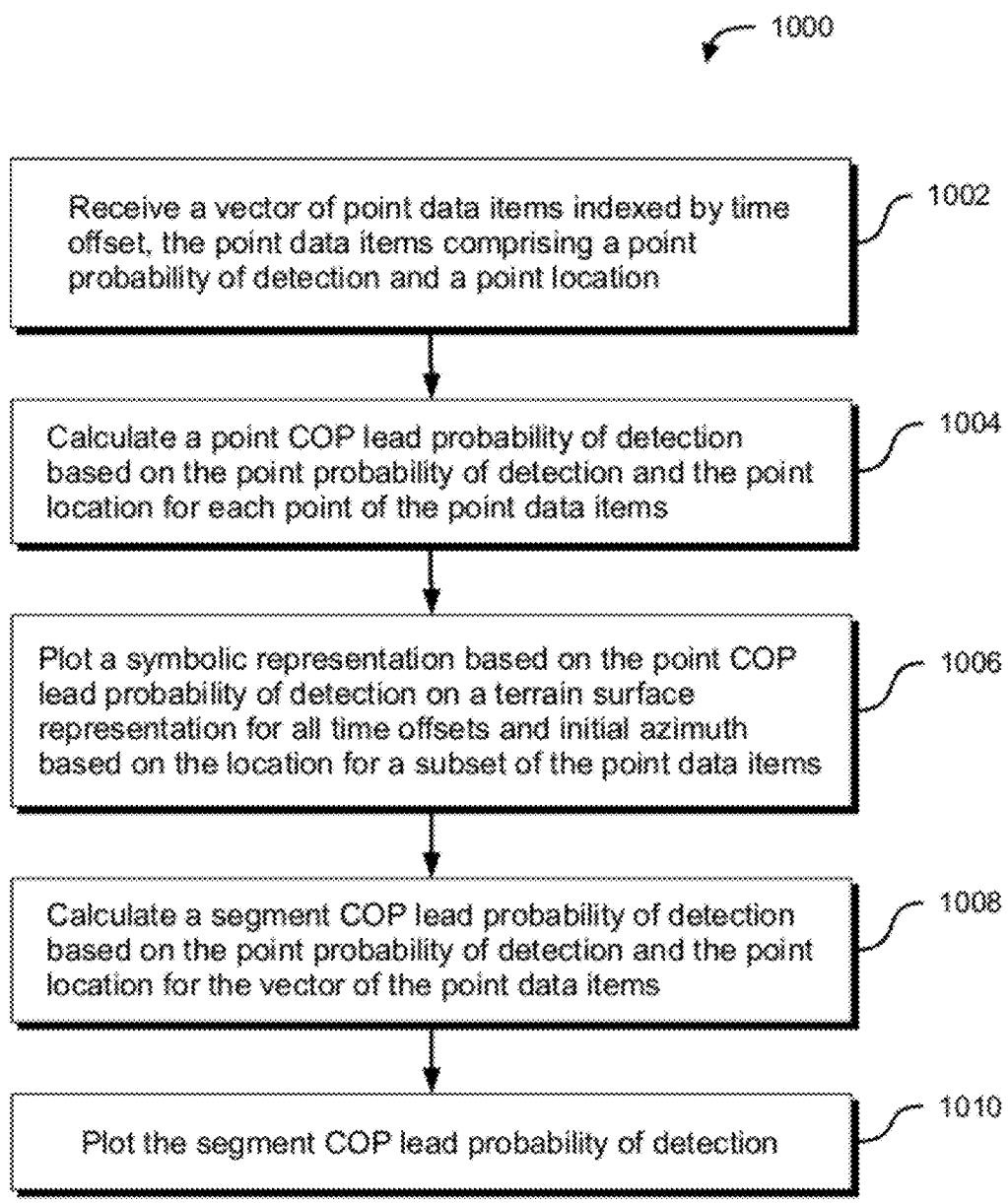
FIG. 10 is an illustration of an exemplary flowchart showing a visualization process for ground surveillance radar performance analysis according to an embodiment of the disclosure.

FIG. 10 is an illustration of an exemplary flowchart showing a visualization process 1000 for ground surveillance radar performance analysis according to an embodiment of the disclosure. The various tasks performed in connection with process 1000 may be performed mechanically, by software, hardware, firmware, or any combination thereof. It should be appreciated that process 1000 may include any number of additional or alternative tasks, the tasks shown in FIG. 10 need not be performed in the illustrated order, and process 1000 may be incorporated into a more comprehensive procedure or process having additional functionality not described in detail herein.

For illustrative purposes, the following description of process 1000 may refer to elements mentioned above in connection with FIGS. 1-7. In practical embodiments, portions of the process 1000 may be performed by different elements of the systems 500-600 such as: the storage module 502, the geometric database module 504, the processor module 506, the display module 508, the scan module 602, the radar track initiation module 604, the data fusion module 606, the COP lead instance simulation module 608, the COP lead initial azimuth simulation module 610, and the segment COP lead simulation module 612. The process 1000 may have functions, material, and structures that are similar to the embodiments shown in FIGS. 1-7. Therefore common features, functions, and elements may not be redundantly described here.

Process 1000 may begin by receiving a vector of point data items indexed by time offset, the point data items comprising a point probability of detection and a point location (e.g., latitude, longitude, elevation) (task 1002).

Process 1000 may continue by calculating the point COP lead probability of detection $P_{COP\ lead\ ik}$ based on the point probability of detection Radar Pd(i) and the probability of getting greater than H radar hits within a specified time $P_{hit\ i}(\geq H)$ (task 1004).

Process 1000 may continue by plotting a symbolic representation based on the point COP lead probability of detection $P_{COP\ lead\ ik}$ on a terrain surface representation for all time offsets i and initial azimuth k based on the location for a subset of the point data items (task 1006). The subset may comprise all the point data items.

Process 1000 may continue by calculating a segment COP lead probability of detection $P_{segment\ COP\ lead}$ based on the point probability of detection and the point location for the vector of the point data items (task 1008).

Process 1000 may continue by plotting (1110 in FIG. 10) the segment COP lead probability of detection $P_{segment\ COP\ lead}$ (task 1010).

Figure 11:
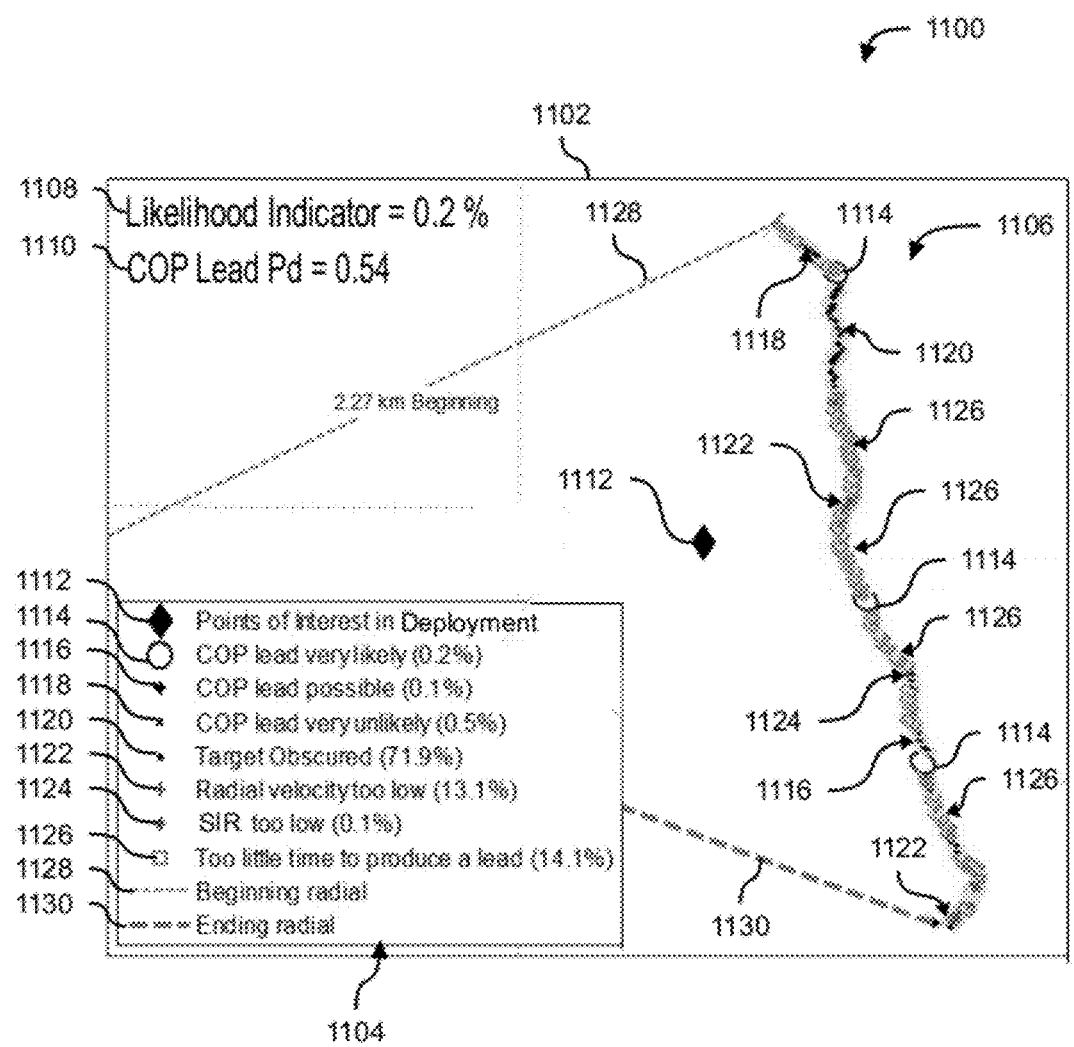
FIG. 11 is an illustration of a visualization of an output of a ground surveillance radar performance analysis converter system according to an embodiment of the disclosure.

FIG. 11 is an illustration of a visualization 1100 of output of a ground surveillance radar performance analysis system 500-600 that can be displayed on the display module 508 according to an embodiment of the disclosure. The visualization 1100 shows areas of a segment where a radar system may perform better or less well, and why. FIG. 11 shows a plot of a segment 1106 (302 in FIG. 3, or 710 in FIG. 7) comprising symbols 1114-1126 that indicate a probability of detection of an item of interest (target) for that location. The symbols may comprise, for example but without limitation, black and white symbols, color symbols, animated symbols, words, numbers, characters, and the like.

As shown in FIG. 11, a legend box 1104 of the visualization 1100 may show a symbol for a beginning radial 1128 and a symbol for an ending radial 1130 of a ground surveillance radar tower (not shown). The beginning radial 1128 and the ending radial 1130 may also be shown on the display screen 1102 of the visualization 1100.

The legend box 1104 may also comprise a points-of-interest in deployment indicator 1112 that are also shown on the visualization 1100. The points of interest in deployment indicator 1112 may indicate, for example but without limitation, a viewing post location, a listening detector location, a seismic detector location, and the like.

Reasons for a low point COP lead probability of detection $P_{COP\ lead\ ik}$ are also given on the visualization 1100. The reasons may be that the target is obscured (71.9% of the points) 1120, the radial velocity is too low (13.1% of the points) 1122, the SIR 1124 is too low (0.1% of the points), or too little time is available to produce a lead (14.1%) (e.g., too-little-time indicator 1126). The likelihood indicators are percentages of the COP lead points that meet certain conditions rather than probabilities, and are used primarily to identify marginal segments. All percentages in the legend box added together will add up to 100% of the points, so every point is grouped into a set of values of the probability of detection, and for points that are below a low probability of detection threshold, the primary reason for non-detection is explained.

Points of the segment 1106 may be divided according to criteria. For example, the "COP lead very likely" (0.2%)

1114, likelihood indicator indicates points of the segment 1106 with a point COP lead probability of detection $P_{COP\ lead\ ik}$ that exceeds a "very likely" criterion. The (0.2%) shows that only 0.2% of the number of points in the segment 1106 meet the "COP lead very likely" criterion. The "COP lead very likely" criterion may comprise, for example but without limitation, a ($P_{COP\ lead\ ik}$>0.9), and the like. The indicator 1114 may show a region of the segment 1106 where the target COP lead is very likely.

The remaining points of the segment 1106 are then subjected to a "COP lead possible" criterion. The indicator 1116 indicates only 0.1% of the number of points in the segment 1106 meet the "COP lead possible" criterion. The "COP lead possible" criterion may comprise, for example but without limitation, a (0.9>$P_{COP\ lead\ ik}$>0.8), and the like. A group of the indicator 1116 may show a region of the segment 1106 where the target is obscured.

The remaining points of the segment 1106 are then subjected to a "COP lead very unlikely" criterion. The indicator 1118 indicates only 0.5% of the number of points in the segment 1106 meet the "COP lead very unlikely" criterion. The "COP lead very unlikely" criterion may comprise, for example but without limitation, a ($P_{COP\ lead\ ik}$<0.2), and the like. A group of the indicator 1118 on the display screen 1102 may show a region of the segment 1106 where the target is obscured.

The remaining points of the segment 1106 are then subjected to a target obscurity measure such as a "target obscured" criterion/measure (target obscuration measure). The target obscuration measure indicator 1120 indicates 71.9% of the number of points in the segment 1106 meets the "target obscured" criterion. The "target obscured" criterion may comprise, for example but without limitation, the fractional target seen in the table 400 along with respective threshold values, and the like. The "fractional target" is the percentage of the target that is visible to the radar above the terrain and foliage. A target that has a low "fractional target" value will be hard to see. For example, if the value of fractional target seen is 20% (0.2) it is less than a threshold value of 25% and if the $P_{COP\ lead\ ik}$ for the point is less than the low probability of detection threshold, system 500 determines the target is obscured (1120). A group of the target obscuration measure indicator 1120 on the display screen 1102 may show a region of the segment 1106 where the target is obscured.

The remaining points of the segment 1106 are then subjected to a radial velocity measure such as a "radial velocity too low" criterion/measure. The radial velocity measure indicator 1122 indicates 13.1% of the number of points in the segment 1106 meets the "radial velocity too low" criterion. The "radial velocity too low" criterion may comprise, for example but without limitation, a radial velocity less than a threshold value of 0.3 m/s (the minimum detectable velocity) and a $P_{COP\ lead\ ik}$ for a point in the segment less than the low probability of detection threshold, and the like. Groups of the indicator radial velocity measure 1122 on the display screen 1102 may show a region of the segment 1106 where the target has low radial velocity.

The remaining points of the segment 1106 are then subjected to a "SIR too low" criterion/measure. The signal to interference ratio (SIR) indicator 1124 indicates only 0.5% of the number of points in the segment 1106 meet the "SIR too low" criterion. The "SIR too low" criterion may comprise, for example but without limitation, items of interest that are far enough away that the radar signal is weak, items of interest (target) for which multipath effects have reduced the radar signal below a threshold of delectability (e.g., 13-14 dB), and the like. A group of the signal to interference ratio (SIR) indicator 1124 on the display screen 1102 may show a region of the segment 1106 where the target has too low SIR.

The remaining points of the segment 1106 are then subjected to a "too little time to produce a lead" criterion/measure. The too-little-time indicator 1126 indicates only 0.5% of the number of points in the segment 1106 meet the "too little time to produce a lead" criterion. The "too little time to produce a lead" criterion may comprise, for example but without limitation, points for which there has not been enough time to develop a radar track, points for which there has not been enough time to get hits for a COP lead, less than 1 sec of dwell time, and the like. Groups of the too-little-time indicator 1126 on the display screen 1102 may show a region of the segment 1106 where a scan has too little dwell time to produce a lead.

The percentages (1114-1126) in the legend box 1104 of FIG. 11 sums to 100%, since all categories are mutually exclusive.

The visualization 1100 may also show data for the entire segment such as a likelihood indicator 1108, and a probability of a segment COP lead 1110. The likelihood indicator 1108 comprises a percent of points of the segment 1106 that exceed a likelihood threshold, for example but without limitation, 0.95 and the like.

In this way, a ground surveillance radar performance analysis system can analyze performance of ground surveillance segment detection of a ground surveillance radar.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 5-6 depict example arrangements of elements, additional intervening elements, devices, features, or components may be present in an embodiment of the disclosure.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 506 to cause the processor module 506 to perform specified operations. Such instructions, generally referred to as "computer program code" or "program code" (which may be grouped in the form of computer programs or other groupings), when executed, enable ground surveillance radar performance analysis methods of the systems 500-600.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A method for ground surveillance radar performance analysis, the method comprising:
receiving by action of a geometric database module a vector of point data items indexed by time offset, the point data items comprising a point probability of detection;
determining by action of a scan module a plurality of initial azimuths of a simulated radar signal of a radar tower based on a field-of-regard of the radar tower;
calculating by action of a COP lead initial azimuth simulation module a plurality of initial azimuth segment probabilities of detection of a COP lead for each of the initial azimuths respectively based on the vector of point data items and the initial azimuths; and
determining by action of a segment COP lead simulation module a segment probability of detection based on the initial azimuth segment probabilities of detection of the COP lead.

2. The method according to claim 1, wherein the step of calculating the initial azimuth segment probabilities of detection of the COP lead further comprises:
calculating a geometric relationship of a latitude and a longitude to a location of the radar tower for each of the point data items of the vector to obtain a plurality of geometric relationships, wherein the point data items further comprise the latitude and the longitude;
determining a plurality of intercept points based on the initial azimuths and the geometric relationship;
determining a probability of detection of a radar track for each of the intercept points;
calculating a probability of meeting data fusion requirements for the radar track; and
calculating the initial azimuth segment probabilities of detection of the COP lead based on the probability of detection of the radar track for each of the intercept points and the probability of meeting the data fusion requirements for the radar track.

3. The method according to claim 1, wherein the segment probability of detection is determined based on the following relationship:

$$P_{segment\ COP\ lead} = \frac{1}{Q}\sum_{k=1}^{Q} P_{azimuth\ segment\ COP\ lead\ k},$$

where $P_{segment\ COP\ lead}$ is the segment probability of detection, $P_{azimuth\ segment\ COP\ lead\ k}$ is one of the initial azimuth segment probabilities of detection of the COP lead for an initial azimuth k, k is an index for an initial azimuth, Q is a number of initial azimuths.

4. The method according to claim 3, wherein the initial azimuth segment probabilities of detection of the COP lead is determined based on the following relationship:

$$P_{azimuth\ segment\ COP\ lead\ k} = 1 - \prod_{i=1}^{N}(1 - P_{COP\ lead\ ik}),$$

where $P_{azimuth\ segment\ COP\ lead\ k}$ is one of the initial azimuth segment probabilities of detection of the COP lead for the initial azimuth k, N is a number of points intercepted for the initial azimuth k, and $P_{OOP\ lead\ ik}$ is a probability of detection of a COP lead at a point with a time offset i and an initial azimuth k.

5. The method according to claim 4, wherein the probability of detection of the COP lead at the point with the time offset i and the initial azimuth k is determined based on the following relationship:

$$P_{COP\ lead\ ik} = \text{Radar } P_d(i) * P_{hit\ i}(\geq H),$$

where $P_{COP\ lead\ ik}$ is a probability of detection of the COP lead at a point with time offset i and initial azimuth k, Radar $P_d(i)$ is a probability of detection of a radar track for a point with the time offset i, and $P_{hit\ i}(\geq H)$ is a probability of getting greater than or equal to H radar hits.

6. The method according to claim 5, wherein the radar track starts based on a number of points with a probability of detection above a detection threshold.

7. The method according to claim 5, wherein the probability of detection of the radar track for the point with the time offset i is determined based on the following relationship:

$$\text{Radar } Pd(i) = \prod_{j=1}^{T} p_k(i-j),$$

where Radar Pd(i) is a probability of detection of the radar track, T is a number of intercept points required to determine the radar track, and $p_k(i-j)$ is a probability of detection of a point with a time offset i−j.

8. The method according to claim 5, wherein the probability of getting greater than or equal to H radar hits is determined based on the following relationship:

$$P_{hit\ i}(\geq H) = 1 - \sum_{j=0}^{H-1} P_{hit\ i}(j),$$

where $P_{hit\ i}(j)$ is a probability of detection of j radar hits, and H is a number of the radar hits.

9. The method according to claim 8, wherein $P_{hit\ i}(j)$ is the probability of detection of j radar hits occurring within a specified time.

10. The method according to claim 8, wherein $P_{hit\ i}(j)$ where j=0 is computed based on the following relationship:

$$P_{hit\ i}(j=0) = \prod_{u=1}^{M} (1 - p_k(i+u)),$$

where M is equal to a number of radar scans within a specified time.

11. The method according to claim 8, wherein $P_{hit\ i}(j)$ where j=1 is computed based on the following relationship:

$$P_{hit\ i}(j=1) = \sum_{v=1}^{M} \left[ p_k(i+v) * \prod_{\substack{u=1 \\ u \neq v}}^{M} (1 - p_k(i+u)) \right],$$

where M is equal to a number of radar scans within a specified time.

12. The method according to claim 1, wherein the vector of point data items is generated by a radar simulation.

13. The method according to claim 1, further comprising determining points scanned, and collating data for a double scan of the radar by action of the scan module.

14. The method according to claim 1, further comprising:
receiving by action of the geometric database module a radar probability of detection for a plurality of location points on a terrain respectively;
calculating by action of a ground surveillance radar performance analysis module a segment probability of detection for a segment based on the radar probability of detection for the location points;
determining the segment is a marginal segment by action of a marginal segment analysis module, if the segment probability of detection meets a marginal segment criterion; and
deploying an additional resource to the marginal segment.

15. The method according to claim 14, wherein the additional resource comprises a resource selected from at least one of the group consisting of: an image detector, a seismic detector, an audio detector, a motion detector, a vehicle, an aircraft, a human resource, a dog, and a barrier.

16. A ground surveillance radar performance analysis system comprising:
a storage module operable to store a vector of point data items indexed by time offset, the point data items comprising a point probability of detection;
a scan module operable to determine a plurality of initial azimuths of a simulated radar signal of a radar tower based on a field-of-regard of the radar tower;
a radar track initiation module operable to calculate a plurality of initial azimuth segment probabilities of detection for each of the initial azimuths respectively based on the vector of point data items and the initial azimuths;
a fusion module operable to calculate a probability of meeting data fusion requirements for a radar track;
a COP lead instance simulation module operable to calculate a probability of detection of a COP lead for a point based on the point probability of detection;
a COP lead initial azimuth simulation module operable to calculate a probability of detection of a COP lead for a segment for one of the initial azimuths based on the probability of detection of the COP lead for each point of the segment and the probability of meeting data fusion requirements for the radar track to obtain an initial azimuth segment probability of detection of the COP lead; and
a segment COP lead simulation module operable to calculate a segment probability of detection based on the initial azimuth segment probabilities of detection of the COP lead.

17. The system according to claim 16, further comprising a marginal segment analysis module operable to determine a marginal segment, if the segment probability of detection meets a marginal segment criterion.

18. A method for visualizing a ground surveillance radar performance analysis, the method comprising:
receiving by action of a geometric database module a vector of point data items indexed by time offset, the point data items comprising a point probability of detection and a point location;
calculating by action of a COP lead instance simulation module a point COP lead probability of detection based on the point probability of detection and the point location for each point of the point data items;
plotting on a display module a symbolic representation based on the point COP lead probability of detection on a terrain surface representation for all time offsets and initial azimuths based on the point location of the point data items;
calculating by action of a segment COP lead simulation module a segment COP lead probability of detection based on the point probability of detection and the point location for the vector of the point data items; and
plotting on the display module the segment COP lead probability of detection.

19. The method according to claim 18, further comprising:
computing by action of a processor module a likelihood indicator comprising a percent of points in the vector of point data items with a point COP lead probability of detection greater than a likelihood threshold; and
plotting on the display module the likelihood indicator.

20. The method according to claim 18, further comprising plotting on the display module an indicator selected from at least one of the group consisting of: a target obscuration measure indicator, a radial velocity measure indicator, a signal to interference ratio (SIR) indicator, and a too-little-time indicator.

* * * * *